(12) United States Patent
Nguyen

(10) Patent No.: US 10,737,574 B2
(45) Date of Patent: Aug. 11, 2020

(54) MOBILE DEVICE DASH KIT AND METHOD OF INSTALLATION

(71) Applicant: Carrichs Accessories, LLC, Paramount, CA (US)

(72) Inventor: Tim Nguyen, Westminster, CA (US)

(73) Assignee: Carrichs Accessories, LLC, Paramount, CA (US)

( * ) Notice: Subject to any disclaimer, the term of this patent is extended or adjusted under 35 U.S.C. 154(b) by 0 days.

(21) Appl. No.: 15/898,567

(22) Filed: Feb. 17, 2018

(65) Prior Publication Data

US 2018/0236873 A1    Aug. 23, 2018

Related U.S. Application Data

(60) Provisional application No. 62/460,695, filed on Feb. 17, 2017.

(51) Int. Cl.
*B60K 37/02* (2006.01)
*F16M 13/02* (2006.01)
(Continued)

(52) U.S. Cl.
CPC .............. *B60K 37/02* (2013.01); *B60K 35/00* (2013.01); *B60K 37/04* (2013.01);
(Continued)

(58) Field of Classification Search
CPC ... B60R 7/06; B60R 2011/0005; B60R 11/02; B60R 2011/0075; B60R 11/0241;
(Continued)

(56) References Cited

U.S. PATENT DOCUMENTS

| | | | | |
|---|---|---|---|---|
| 5,350,608 A | * | 9/1994 | Zoller | B60R 13/04 293/1 |
| 5,971,558 A | * | 10/1999 | Peel | G01D 11/28 362/23.15 |
| 5,992,807 A | * | 11/1999 | Tarulli | B60R 11/0241 248/205.3 |
| 6,426,130 B2 | * | 7/2002 | Jones | B29C 51/14 264/241 |
| 6,786,472 B1 | * | 9/2004 | Dahl | B25B 31/00 254/25 |
| 7,163,249 B2 | * | 1/2007 | Schmidt | B60K 35/00 296/37.12 |

(Continued)

FOREIGN PATENT DOCUMENTS

JP    09273945 A  *  10/1997

*Primary Examiner* — Adam J Waggenspack
(74) *Attorney, Agent, or Firm* — Intellectual Property Law Group LLP

(57) ABSTRACT

A casing removably attached to a vehicle dashboard using a plurality of mating components. The casing is configured to receive and release a mobile device that is slidably insertable through an aperture in a surface of the casing. The casing is configured with an opening to view the display of the device and has a securing mechanism to hold the inserted device in place. The mounting/mating components may be magnetic. There is a method of installing a removably mountable casing having preattached mounting components to a vehicle dashboard. The method comprises removing the dashboard, aligning the casing against a front side of the dashboard; preparing the dashboard at a location where a plurality of mating components will be attached; attaching the plurality of mating components to the location; reconnecting the dashboard; and mounting the casing such that the mounting components correspondingly mate to the mating components on the dashboard.

19 Claims, 8 Drawing Sheets

(51) Int. Cl.
*B60R 11/02* (2006.01)
*B60K 35/00* (2006.01)
*B60K 37/04* (2006.01)
*B60R 11/00* (2006.01)

(52) U.S. Cl.
CPC ......... *B60R 11/0241* (2013.01); *F16M 13/02* (2013.01); *B60K 2370/81* (2019.05); *B60K 2370/828* (2019.05); *B60K 2370/834* (2019.05); *B60R 2011/0005* (2013.01); *B60R 2011/0075* (2013.01)

(58) Field of Classification Search
CPC ......... B60R 2011/0047; B60R 11/0205; B60R 11/0252; B60R 11/00; B60K 2370/81; B60K 2370/816; B60K 2370/828
USPC .......................................................... 224/483
See application file for complete search history.

(56) References Cited

U.S. PATENT DOCUMENTS

| | | | |
|---|---|---|---|
| 8,104,819 B2 * | 1/2012 | Biggs | B60R 11/02 296/72 |
| 8,398,155 B2 * | 3/2013 | Andochick | B60R 11/00 224/483 |
| 9,150,105 B2 * | 10/2015 | Crepaldi | B60R 11/0235 |
| 9,446,720 B1 * | 9/2016 | Prazeres | B60R 11/0258 |
| 9,521,224 B2 * | 12/2016 | An | H04B 1/3883 |
| 9,729,181 B2 * | 8/2017 | Brey | H04B 1/3822 |
| 9,914,407 B2 * | 3/2018 | Zeiger | B60R 13/0256 |
| 2010/0144404 A1 * | 6/2010 | Cavani | B60R 11/0241 455/575.1 |
| 2014/0106734 A1 * | 4/2014 | Lee | H04W 4/80 455/419 |
| 2017/0101006 A1 * | 4/2017 | DeVries | B60R 25/00 |

* cited by examiner

MOBILE DEVICE DASH KIT AND METHOD OF INSTALLATION

CROSS-REFERENCE TO RELATED APPLICATION

This application claims the benefit of U.S. Provisional Application No. 62/460,695, filed Feb. 17, 2017, which is hereby incorporated by reference in its entirety.

FIELD OF THE INVENTION

This invention relates to vehicle accessories, more specifically to vehicle accessories that can hold a mobile device while mounted on the dashboard of a vehicle.

BACKGROUND

Mobile devices such as iPads, mobile phones and the like are used in vehicles for activities such as playing music, movies, using software applications, or the Global Positioning System ("GPS"). However, in order to install a mount for the mobile device that is seamless with the dashboard, most automotive enthusiasts go to a custom audio shop to fabricate a vehicle factory dashboard. This can be costly, time intensive and permanently alters the look of the dashboard.

Most people own a mobile device and most people use their mobile device for navigation instead of the factory navigation system because the mobile device navigation system has live traffic updates and applications like Google Maps or Waze which helps people get to their destination a lot quicker and easier. Not only does the user have the perfect navigation system, but the user will have all the applications, movies, and music linked to the user's car via Bluetooth or via an auxiliary cable. Applications such as OBD2 dongle can be used to monitor the car performance on the mobile device. Users who want to modify their vehicle dashboard to install a mobile device can spend thousands of dollars in custom fabrication work and they will lose their factory radio and void their vehicle factory warranty.

Accordingly, there is a need for an easy, cost effective, seamless, quick, and nonpermanent mounting accessory that can mount onto a vehicle dashboard that secures mobile devices in place. There is also a further need to maintain the factory radio when mounting and dismounting the casing occurs and mounting the casing without permanently altering the dashboard of the vehicle.

SUMMARY

According to an embodiment, there is a casing mountable on a dashboard, configured to receive and support a mobile device within an inner surface of the casing, wherein the casing and the dashboard do not require customization prior to mounting on the dashboard. The casing comprises one or more mounting components on a back surface of the casing for mounting the casing onto the dashboard. The casing has a front surface having an opening for viewing a display of the mobile device, the front surface extends to a top surface, a bottom surface, a left surface and a right surface. There is a securing mechanism on the inner surface of the casing securing the mobile device in place and at least one aperture in a surface of the casing for inserting or removing the mobile device. The one or more mounting components of the casing are configured to mate with one or more mating components that are attached to an internal surface or front surface of the dashboard.

According to another embodiment of the present invention, there is a casing system/dash kit for removably mounting the casing to the dashboard, where the casing and the dashboard do not require customization prior to mounting the casing on the dashboard. The casing is configured to receive and support a mobile device within an inner surface of the casing and the casing comprises one or more magnetic mounting components on a back surface of the casing. The casing system further comprises one or more magnetic mating components which are attachable to an internal surface or outer surface of the dashboard for mating with the one or more magnetic mounting components on the back surface of the casing.

In yet another embodiment of the present invention, there is a method of installing a removably mountable casing having one or more preattached mounting components to a dashboard of a vehicle, wherein the method of installing the casing comprises removing the dashboard from the vehicle, aligning the casing against a front surface of the dashboard, preparing a portion of the dashboard for attaching one or more mating components, attaching the one or more mating components to the portion of the dashboard, reinstalling the removed dashboard to the vehicle, and mounting the casing such that the one or more preattached mounting components mate with the one or more mating components.

These features, advantages and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

DETAILED DESCRIPTION OF SPECIFIC EMBODIMENTS

Figure 1:
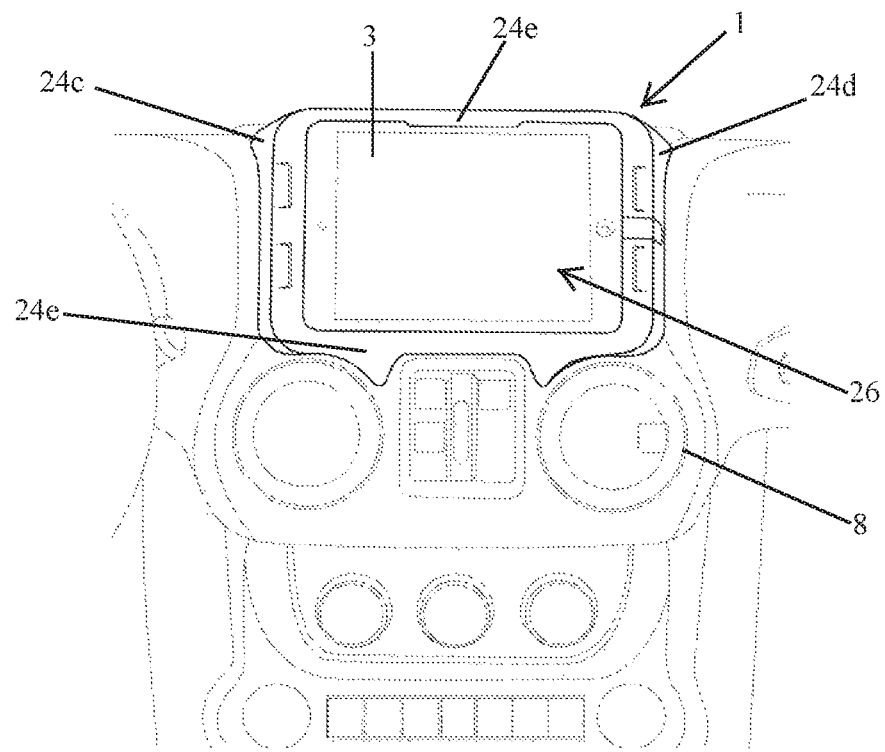
FIG. 1 illustrates a fully assembled front view of the casing receiving a mobile device and mounted on a dashboard, according to an embodiment.

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

According to embodiments of the present invention, the casing 1 as shown in FIGS. 1-13B may be provided in a kit, i.e. a casing system. The kit comprises a casing 1 with one or more mounting components, which may be preinstalled in the casing 1. In one embodiment, the mounting components are preinstalled to the rear of the casing 1 such that the casing 1 is ready for use. The mounting components refer to magnetic components 5, fabric hook and loop fasteners such as Velcro, double sided tape, or suction cups and the like that are installed on the casing 1. The mounting components can be different shapes and sizes such as bar shaped, coin shaped and the like. The kit also comprises corresponding mating components 70, which refer to the components that mate with the mounting components. The mating components 70 can be magnets, fabric hook and loop fasteners such as Velcro, double sided tape, or suction cups and the like that are attached to the vehicle dashboard 8. The mating components 70 can be different shapes and sizes such as bar shaped, coin shaped and the like. When the mounting component 5 is double sided tape or the like, one or more mating components 70 for the dashboard 8 are not required because the casing 1 adheres to the front surface of the dashboard 8 with the double sided tape. The kit also comprises templates, which help the user determine where to attach the mating components 70 on the inside of the internal surface 20 of a vehicle dashboard 8. The kit also includes a promoter such as an adhesive promoter which is applied to the dashboard to help promote the adhesion of the mating component 70 to the internal surface 20 of a vehicle dashboard 8 or to the front of the dashboard 8. The components of the kit can be sold separately. A hex socket driver and a pry tool are used for removing the vehicle dashboard 8. Mounting the casing 1 does not require altering the factory vehicle dashboard 8 and is affordable and easy to install, therefore requiring no customization of the casing or the dashboard at time of installation. Once mounted, the casing 1 appears as an integral part of the dashboard 8.

Embodiments of the present invention comprise a casing 1 for mounting on a dashboard 8 of a vehicle, which is configured to receive and support a mobile device 3. Mounting components refer to magnetic component 5, fabric hook and loop fasteners such as Velcro, double sided tape, or suction cups and the like that are preinstalled on the casing 1. Mating components 70 refer to the components that mate with the mounting components. The mating components 70 can be magnets, fabric hook and loop fasteners such as Velcro, double sided tape, or suction cups and the like that are attached to the vehicle dashboard 8. The mating components 70 can be attached to the internal surface 20 of a vehicle dashboard 8 or front surface of the vehicle dashboard 8. The casing 1 can be dismounted by pulling the casing 1 from the dashboard 8 when not in use.

FIG. 1 illustrates a fully assembled view of the casing 1 removably mounted on the dashboard 8 (shown in phantom lines) receiving and supporting a mobile device 3 (shown in phantom lines), according to an embodiment. The display of the mobile device 3 can be seen through the opening 26. The opening 26 can also be referred to as an aperture. The casing 3 is pre-customized as there are various embodiments of the casing 1 in order to match the various models of each vehicle dashboard. For example there can be a casing 1 made for at least the following make and model of vehicles: Chevy, Colorado, Silverado; Dodge, Ram; Ford, F-150, Mustang; Jeep, Wrangler; Subaru, Forester/XT, WRX/STI, XV Crosstrek. Some embodiments measure about 11 inches length× 3.5 inches wide×7 inches height; 11 inches length×3.5 inches wide×7 inches height; 10.5 inches length×2 inches wide×7.5 inches height; or about 10 inches length×3 inches wide×8 inches height. The casing 1 can be made of polypropylene or polyethylene material; however, other materials can also be contemplated. The process of making the casing 1 can be by plastic injection or by thermos plastic vacuum forming. The mobile device 3 can be connected via auxiliary, USB, or Bluetooth. Having a mobile device in the vehicle allows the user to use applications beyond what is offered by the factory as the user can download applications for their mobile device 3.

Figure 10:
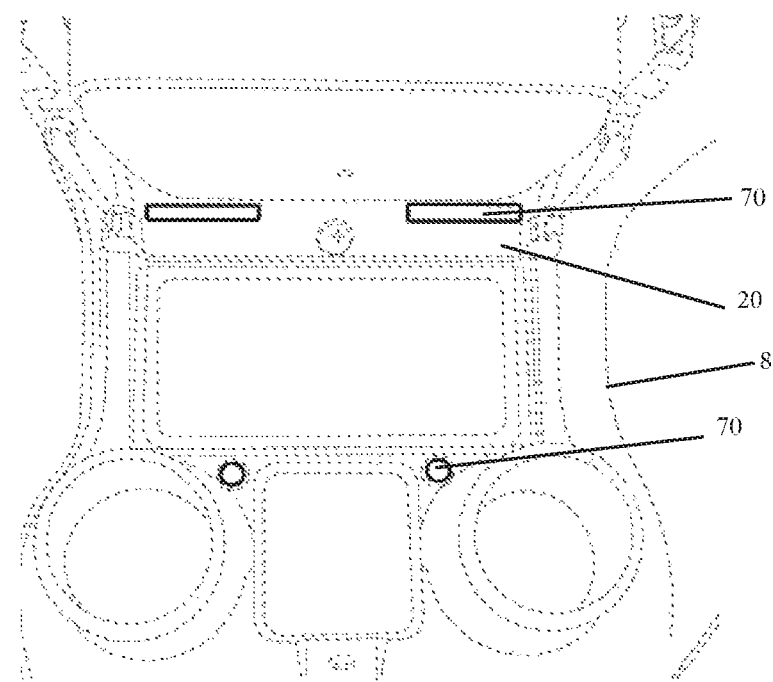
FIG. 10 illustrates magnetic mating components installed on the internal surface of a vehicle dashboard, according to an embodiment.

As illustrated in FIG. 1, the casing 1 is mounted in alignment to the dashboard 8 of a vehicle by mounting components, i.e., magnetic components 5 (not shown, see FIG. 2B) attached to the back surface 18 of casing 1 and mating component 70 attached to an internal surface 20 of a vehicle dashboard 8 (not shown, see FIG. 10). The templates 14 help the user properly align the mating component 70 onto the internal surface 20 of a vehicle dashboard 8. For example, the templates 14 can be aligned to the corner edges of the internal surface 20 of the vehicle dashboard 8 and a mating component 70 is attached based on the outline of the template 14.

Depending on the make and model of the vehicle, the casing 1 can also be aligned in a vertical direction along the vehicle dashboard 8. When the casing 1 is aligned in a vertical direction, the shortest dimension of the casing is set in a vertical position relative to the dashboard. When the casing 1 is aligned in a horizontal direction, the longest dimension of the casing is set in a horizontal position relative to the dashboard. The mounting components, i.e., magnetic components 5 (not shown, see FIG. 2B) are hidden from view and provide a seamless look when the casing 1 is mounted to the vehicle dashboard 8. An example of a mounting component is the magnetic components 5, which also provides the casing 1 the ability to easily mount and dismount from the vehicle dashboard 8 without having to permanently modify the vehicle dashboard 8.

The casing 1 as disclosed in the present invention, are pre-customized because the casing 1 is manufactured to have the form and shape of a particular make and model dashboard 8 before the user mounts it. For example, there are casings 1 manufactured for the make and model of Chevy, Colorado, Silverado; Dodge, Ram; Ford, F-150, Mustang; Jeep, Wrangler; Subaru, Forester/XT, WRX/STI, XV Crosstrek, and the user only has to remove the factory vehicle dashboard 8 and attach the mating component 70 onto the vehicle dashboard 8 in order to install the casing 1. The casing 1 of the present invention does not require, like previous casings, the user to customize the dashboard or casing by removing the vehicle dashboard and permanently re-shaping the dashboard or permanently removing the factory radio because there is not enough room for both. The disadvantages of previous casings require the user to customize the casing with fiber glass, cutting, applying Bondo products or painting before installing.

Figure 2A:
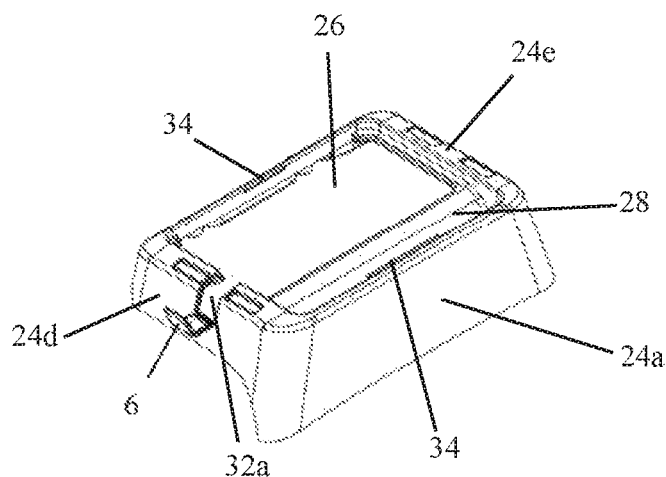
FIG. 2A illustrates a top, front, right side perspective view of the casing of FIG. 1, according to an embodiment.

FIG. 2A illustrates a top, front, right side perspective view of the casing 1, according to an embodiment. The casing 1 comprises the front surface 24e, top surface 24a, bottom surface 24b, left surface 24c, right surface 24d or back surface 18. The front surface 24e extends to form the top surface 24a, bottom surface 24b (not shown, see FIG. 6B), left surface 24c (not shown, see FIG. 8), right surface 24d and for each embodiment, these surfaces can be different lengths and shape depending on the make and model of the vehicle dashboard 8 that the casing 1 mounts on. There is a charging tab 6 that covers the gap 32a for the charging cable. The charging tab 6 allows easy access to the mobile device for charging when it is secured in the casing.

When the charging cable is plugged into the mobile device 3 the charging tab 6 will cover the cable as it runs from the mobile device 3 through the gap 32 to provide a seamless look. FIG. 2A illustrates the gap 32a and charging tab 6 on the right surface 24d; however, the gap 32a and charging tab 6 can be on any of the surfaces of the casing 1. When the user needs to charge or plug-in an axillary cable to the mobile device 3, the charging tab 6 will be open. Once charging is complete, the user can remove the wire and close the charging tab 6.

As mentioned, the curves and contours of the top surface 24a, bottom surface 24b, left surface 24c, right surface 24d, and back surface 18 can change depending on the vehicle dashboard make and model that the casing 1 mounts on. There is an opening 26, also referred to as an aperture, that allows a user to view the display of the inserted mobile device 3. In one embodiment, the user inserts the mobile device 3 through the opening 26 and then secures the mobile device 3 against the extended recessed portion 28 of the inner surface 22 of the casing 1. For this embodiment, once the mobile device 3 is inserted through the opening 26, it is held in place by two lips 34 on the front surface 24e as the mobile device 3 rests against the extended recessed portion 28.

Figure 2B:
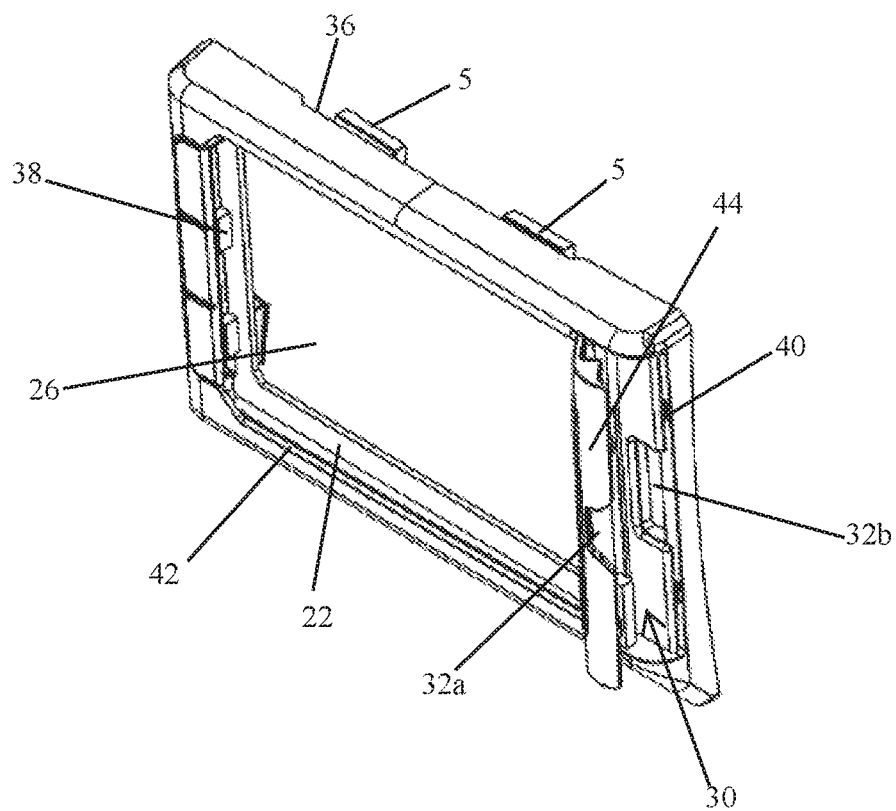
FIG. 2B illustrates a top, front, right side perspective view of another version of the casing, according to an embodiment.

FIG. 2B illustrates a perspective view of another version of the outer surface of the casing 1, according to another embodiment. In the embodiment illustrated in FIG. 2B, the user slides the mobile device 3 through the slot 30 and along the channel 42 in the inner surface 22 of the casing 1. The slot 30 can also be referred to as an aperture. The channel 42 can be on the bottom surface 24b, top surface 24a, left surface 24c, or right surface 24d of the inner surface 22. The securing mechanism can be the channel 42, extended recessed portion 28 or lip 34. In this particular embodiment, the channel 42 is the securing mechanism and it secures the mobile device 3 into place when the user has fully inserted the mobile device 3 into the inner surface 22, along the channel 42. Then the user can close the slot 30 with a lockable cap 44 and it snaps into the snap lock 40. The cushions 38 in the channel 42 absorb vibration. The user can thread the charging cable through the gap 32a or if the user wants to route the charging cable internally, the user can thread it through the gap 32b. The casing 1 comes with magnetic components 5 preattached and the preattached magnetic components 5 aligns with the mating components 70 installed in the internal surface 20 of a vehicle dashboard 8. The preattached magnetic components 5 can be made of neodymium magnets. The magnetic components 5 are on specific locations on the casing 1 so that the magnetic components 5 do not interfere with the functionality of the mobile device 3. The magnetic components 5 can interfere with the sensors of the mobile device 3 or turn off the mobile device 3. Likewise, the mating components 70 are on specific locations on the internal surface 20 of a vehicle dashboard 8 so that the dashboard 8 is aligned with the casing 1 and do not interfere with mechanical components of the vehicle. The bottom portion of the opening 26 is slightly beveled in some embodiments to allow the user to pull up the menu on the mobile device 3 using one's finger.

Figure 3:
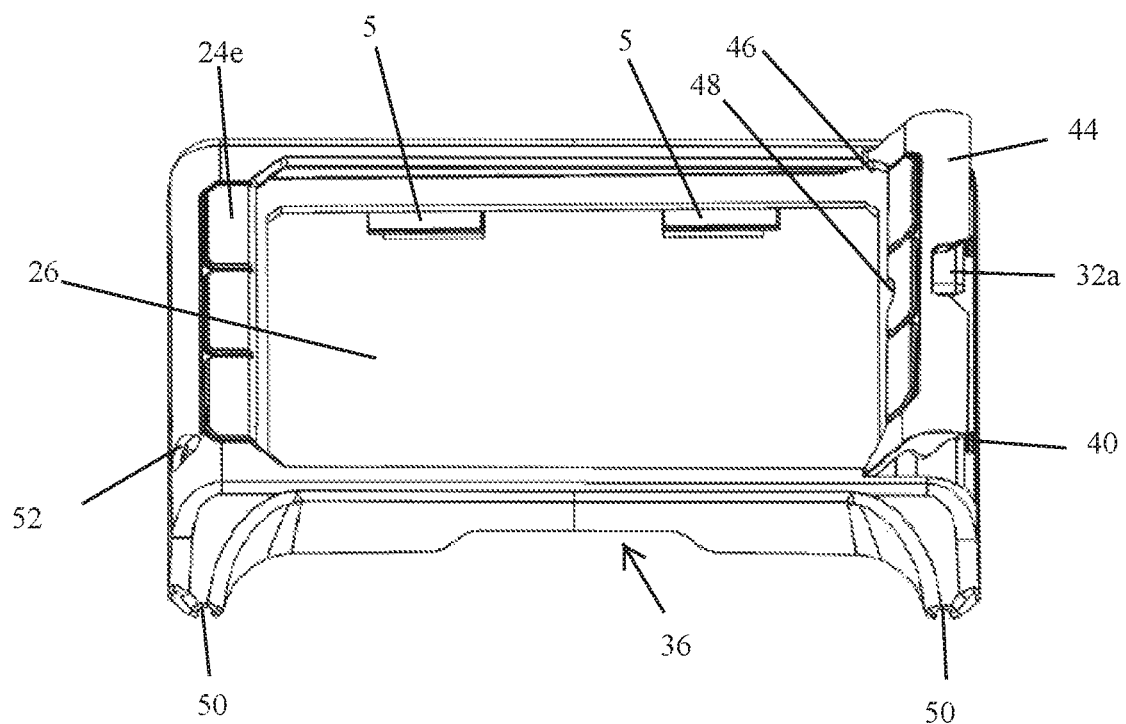
FIG. 3 illustrates a front view of the casing of FIG. 2B, according to an embodiment.

FIG. 3 illustrates a front view of the casing 1 of FIG. 2B, according to an embodiment. As mentioned above, the shape and dimension of the each casing 1 can vary depending on the make and model of the vehicle dashboard 8 that the casing 1 mounts on. In this embodiment, the casing 1 comprises a hole 52 for a 3.5 mm audio jack input and the like. There is also an outlet 50 for charging wires and 3.5 mm audio wire feed and the like. The hole 52 and outlet 50 can be on any surface of the casing 1. Air flow to cool the mobile device 3 can be assisted by the ventilation cutout 36. The cutout 48 for the home button on the mobile device 3 allows the user easy access to the button when the lockable cap 44 is securely fastened in the snap lock 40. There is also a gap 32a for the charging cable to be plugged-in while the lockable cap 44 is fully secured. The metal pins 46 allows the lockable cap 44 to be open and closed with ease and is used to increase the longevity of the part performance; of course, other methods can be contemplated, such as a hinge. There is also a plurality of magnetic components 5 fixed to the back surface of the casing 1. Depending on the embodiment of the casing 1, the magnetic components 5 are at certain areas on the back surface 18 and are different shapes.

Figure 4A:
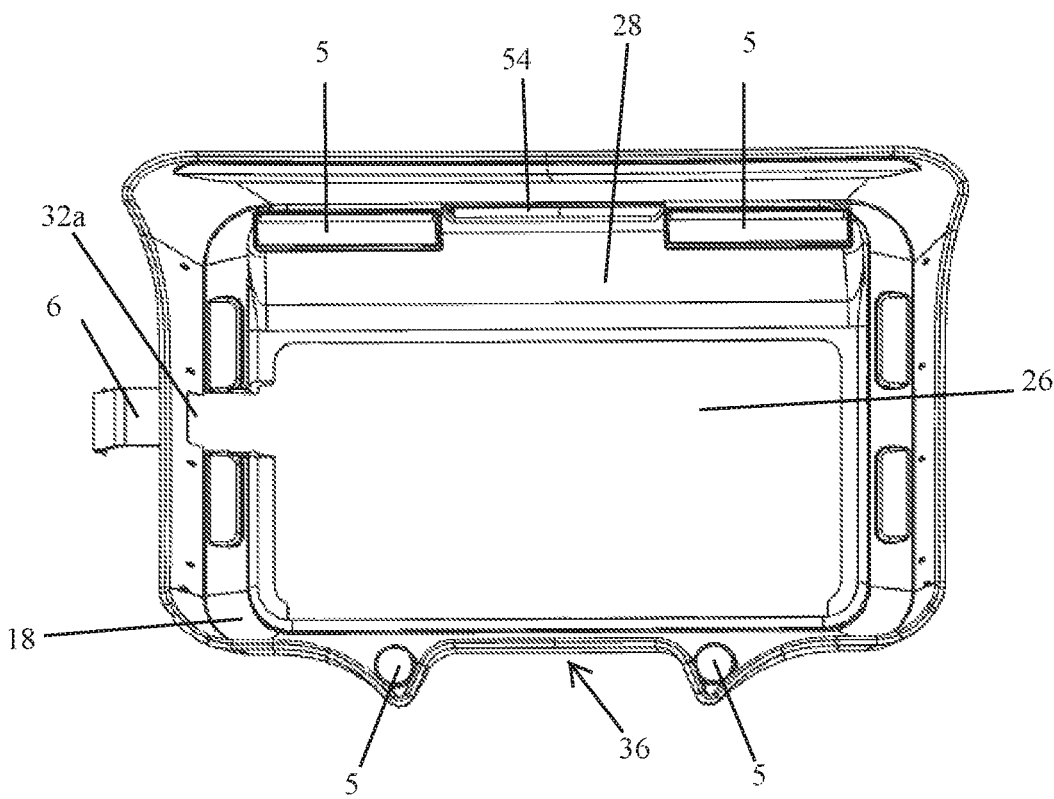
FIG. 4A illustrates a back view of the casing of FIG. 2A, according to an embodiment.

FIG. 4A illustrates a back view of the casing 1 of FIG. 2A, according to an embodiment. In this particular embodiment, the casing 1 comprises a plurality of magnetic component 5 on the back surface 18 of the casing that is bar shaped magnets and coin shaped magnets and are preinstalled on the casing 1. The bar shaped magnets and coin shaped magnets assist the casing 1 to removably secure to the factory vehicle dashboard 8 by attracting to the opposite pole similarly shaped mating component 70 installed on the internal surface 20 of a vehicle dashboard 8.

These magnetic component 5 will align and mate with the mating component 70 attached to the internal surface 20 of a vehicle dashboard 8. There is a charging tab 6 that covers the gap 32a for the charging cable. There is a plurality of gussets 54 along the outer edge of the back surface 18 to minimize warping. In order to cool the mobile device 3, the casing 1 has a ventilation cutout 36 which allows the air to easily flow through. There is also a hole 52 (not shown, see FIG. 3) for a 3.5 mm audio jack input and the like. The casing 1 has an opening 26 that allows the user to see the mobile device 3.

Figure 4B:
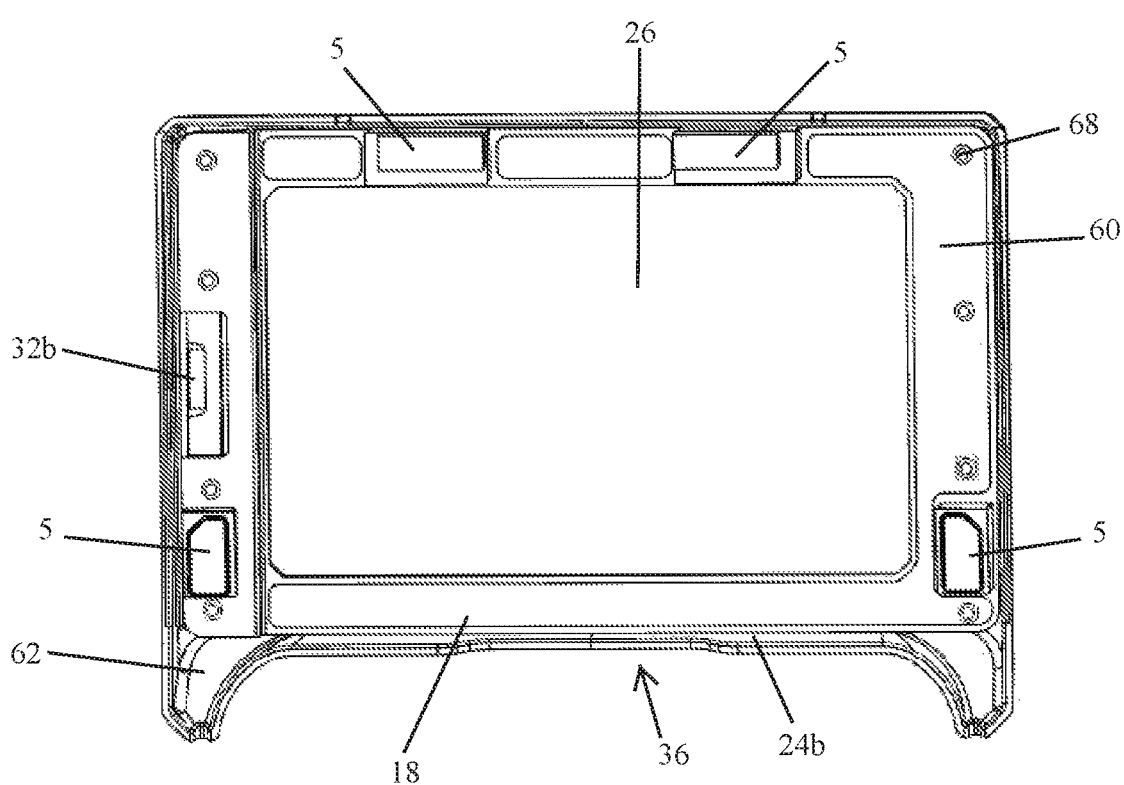
FIG. 4B illustrates a back view of the casing of FIG. 3, according to an embodiment.

FIG. 4B illustrates a back view of the base plate 60 of the version of the casing 1 of FIG. 3, according to an embodiment. The embodiment shown in FIG. 4B has mating magnetic components 5 attached to the back surface 18 of the base plate 60. There is also a base plate 60 connected to the outer shell 62 by multiple screws 68; however, the back surface 18 of the base plate 60 can also be permanently fused together. A ventilation cutout 36 is at the bottom surface 24*b* of the casing 1. This embodiment has a gap 32*b* for the charging cable if the user wants to route the wire internally.

Figure 5:
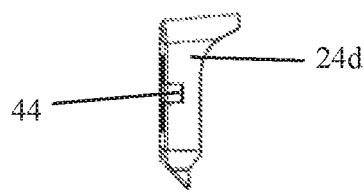
FIG. 5 illustrates a right view of the casing of FIG. 2A with a lockable cap, according to an embodiment.
Figure 6A:
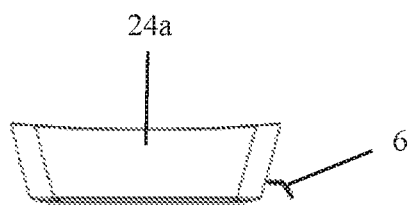
FIG. 6A illustrates a top view of the casing of FIG. 2A, according to an embodiment.
Figure 6B:
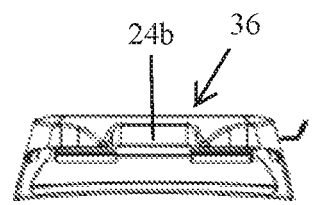
FIG. 6B illustrates a bottom view of the casing of FIG. 2A, according to an embodiment.

FIG. 5 illustrates a right view of the casing 1 of FIG. 2A, according to an embodiment with a lockable cap 44 attached to the right surface 24*d*. FIG. 6A illustrates a top view of the casing 1, according to an embodiment with the charging tab 6 ajar. The shape of the top surface 24*a* varies depending on the make and model of the vehicle dashboard 8 on which it mounts. Magnetic components 5 such as bar shaped magnets are already installed on the inner surface 22 of the casing 1. FIG. 6B illustrates a bottom view of the casing, according to an embodiment. There is a bottom surface 24*b* having a formation of the ventilation cutout 36 in this embodiment. The ventilation cutout 36 allows the surrounding air and air from the air condition to flow through to cool down the mobile device 3.

Figure 7:
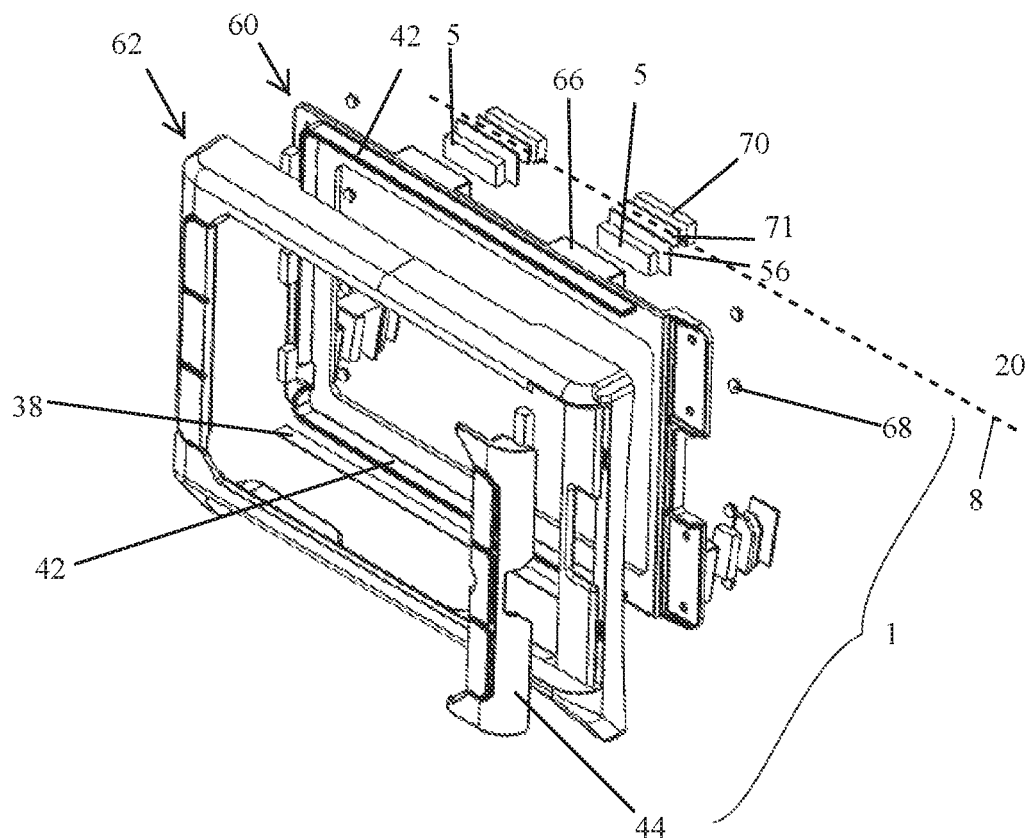
FIG. 7 illustrates an exploded perspective view of the casing of FIG. 2B with mating components, according to an embodiment.

FIG. 7 illustrates an exploded perspective view of an embodiment of a casing 1 of FIG. 2B on the vehicle dashboard 8 and also with mating components on the internal surface 20 of a vehicle dashboard 8. The dotted line denotes the dashboard division of the front surface and internal surface of the dashboard. For this particular embodiment, the casing 1 comprises a lockable cap 44 attached to an outer shell 62 by metal pins 46. The outer shell 62 is attached to the base plate 60 by a plurality of screws 68. The base plate 60 comprises channels 42 to slidably receive the mobile device 3 (not shown, see FIG. 14B). On the channels 42, there are cushions 38 to reduce vibration. On the back surface 18 of the casing, there is attached a magnetic component housing 66. The magnetic components 5 are disposed in the housing 66. To the backside of the magnetic components 5, there may be protective tape 56 so that when the user is ready to mount the casing, the protective tape 56 can be removed and the magnetic components 5 are exposed. The protective tape 56 may be discarded once the casing is ready to be mounted. The mating components 70 are adhesively adhered onto the internal surface 20 of a vehicle dashboard 8. In an embodiment, there is a layer of adhesive 71 attached to the individual mating component 70 and the adhesive 71 is covered by a release liner. When the user is ready to attach the mating component 70 to the internal surface 20 of the vehicle dashboard 8, the user takes off the release liner from the adhesive 71 of the mating component 70 and sticks the mating component 70 onto the internal surface 20 of the vehicle dashboard 8 (not shown, see FIG. 10).

Figure 8:
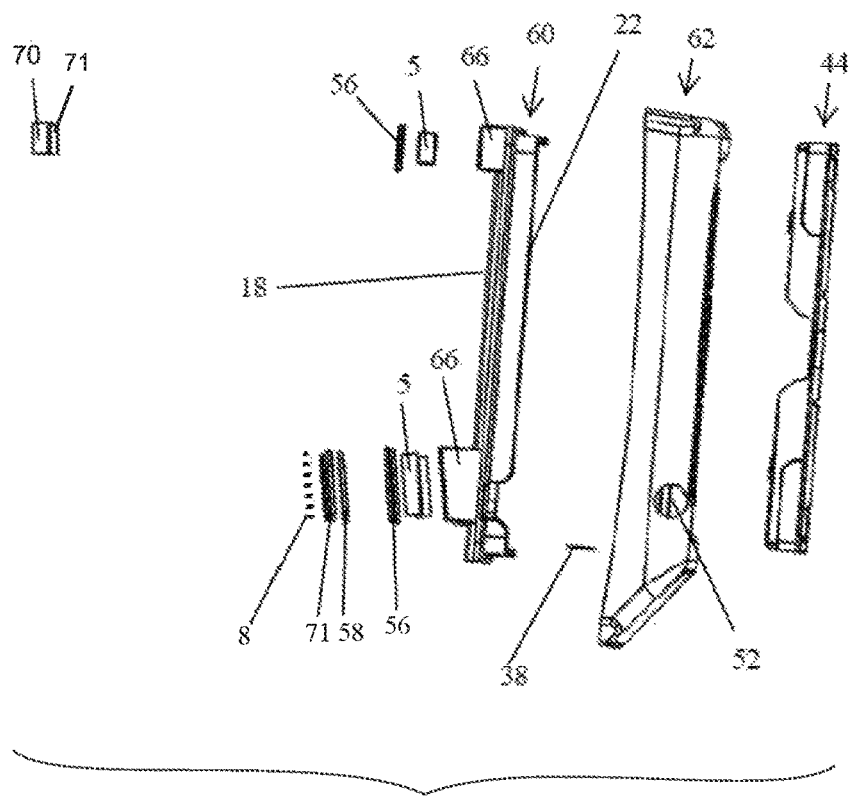
FIG. 8 illustrates an exploded left side view of the casing of FIG. 7, according to an embodiment.

FIG. 8 illustrates an exploded view of the left side view of the casing 1 of FIG. 7, according to an embodiment. FIG. 8 further illustrates that for this particular embodiment, there is a lockable cap 44 attached to an outer shell 62, which is then attached to a base plate 60, and on the back surface 18 of the casing 1, there are housings 66 that have mating magnetic component 5. To the back of the magnetic component 5 there is protective tape 56 that is later removed when the casing 1 is mounted.

As illustrated in FIG. 8, on the front of the vehicle dashboard 8 there is a metal sheet 58 attached by an adhesive 71 because some vehicle dashboards 8 have no space to attach magnetic components 70 on the internal surface 20 of the vehicle dashboard. Therefore, a metal sheet 58 is attached to the front of the dashboard 8 and acts as a mating component for the magnetic component 5 on the casing 1. Accordingly, instead of mating with a mating component 70 on the internal surface 20 of a vehicle dashboard 8, the magnetic component 5 on the casing 1 mates with the metal sheet 58. Alternatively, in some embodiments as previously discussed, the magnetic components 5 mate with mating components 70 attached by adhesive 71 to the internal surface 20 of the vehicle dashboard 8. On the outer shell 62, there is a hole 52 for a 3.5 mm audio jack input. On the base plate 60, there is cushion 38.

Figure 9:
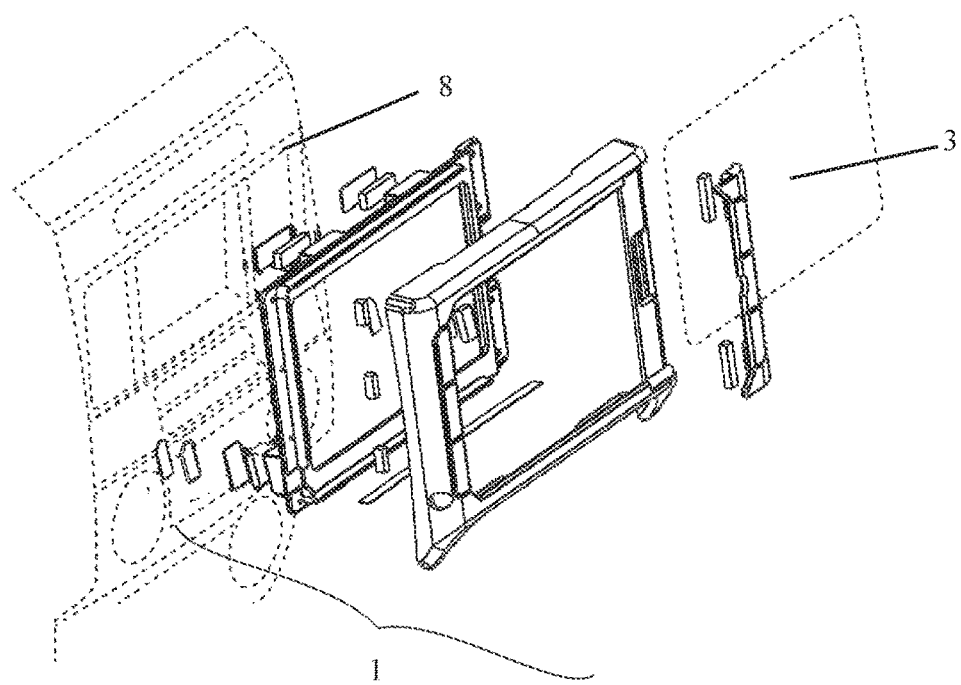
FIG. 9 illustrates an exploded view of the casing of FIG. 2B with the vehicle dashboard, according to an embodiment.

FIG. 9 illustrates an exploded view of the casing 1 of FIG. 2B receiving a mobile device 3 against the vehicle dashboard 8, according to an embodiment.

There is a method of installing the casing 1, to the vehicle dashboard 8 according to an embodiment. A method of installment varies slightly depending on the model and make of the vehicle dashboard 8. The method generally comprises removing the factory vehicle dashboard 8 from the vehicle. Depending on the make and model of the vehicle, certain parts will need to be detached from the vehicle dashboard 8 to completely remove it. For example, there may be a connector for power windows that may need to be disconnected or a speaker connector. Using the tools provided in the kit, the vehicle dashboard 8 is removed. To assure proper alignment between the dashboard 8 and casing 1, the casing 1 is placed over the vehicle dashboard 8 and secured with masking tape. The vehicle dashboard 8 is prepared for receiving one or more mating components 70. In particular, the internal surface 20 of the vehicle dashboard 8 is wiped with a promoter such as an adhesive promoter 16 and allowed to air dry. The template 14 is then aligned to designated areas on the internal surface 20 of the vehicle dashboard 8. The release liner of the adhesive 71 is peeled off and the mating magnetic component 70 is firmly held to designated locations as directed by the template on the internal surface 20 of the vehicle dashboard 8. Once the mating components 70 are installed on the internal surface 20 of the vehicle dashboard 8, the removed dashboard 8 is reinstalled onto the vehicle. The casing 1, having preattached mounting components 5, is then removably mountable upon the dashboard such that the mounting components 5 correspond to the mating components 70. For magnetic mounting components 5, the casing 1 is easily and quickly mounted by magnetic connection to the dashboard via magnetic mating components 70.

Another method of installing another embodiment of the casing 1 comprises removing the internal surface 20 of a vehicle dashboard 8 from the vehicle, placing templates 14 on designated areas on the internal surface 20, peeling off the release liner from the adhesive 71 of the two mating component 70 and adhering the two mating component 70 to designated spots on the internal surface 20 of the vehicle dashboard designated by the templates 14. The method further comprises then peeling off the release liner from the adhesive 71 of the two metal sheets 58 and adhering the metal sheets 58 to designated spots on the front of the vehicle dashboard 8. Metal sheets 58 are attached to portions of the front of the dashboard 8 because there are mechanical parts on the internal surface 20 of the vehicle dashboard 8 that prevent adhering the mating magnetic component 5. Once this is completed, the vehicle dashboard 8 is reinstalled to the vehicle.

FIG. 10 illustrates a mating component 70 installed on the internal surface 20 of a vehicle dashboard 8 (rear view of dashboard shown in phantom lines), according to an embodiment. In other embodiments, the mating components 70 can instead be placed on the front surface 24*e* of the dashboard 8 instead of on the internal surface 20 of a vehicle dashboard 8 because a component from the factory dashboard blocks attachment. In other embodiments, the magnetic components 5 and mating component 70 can be other shapes and types.

Figure 11:
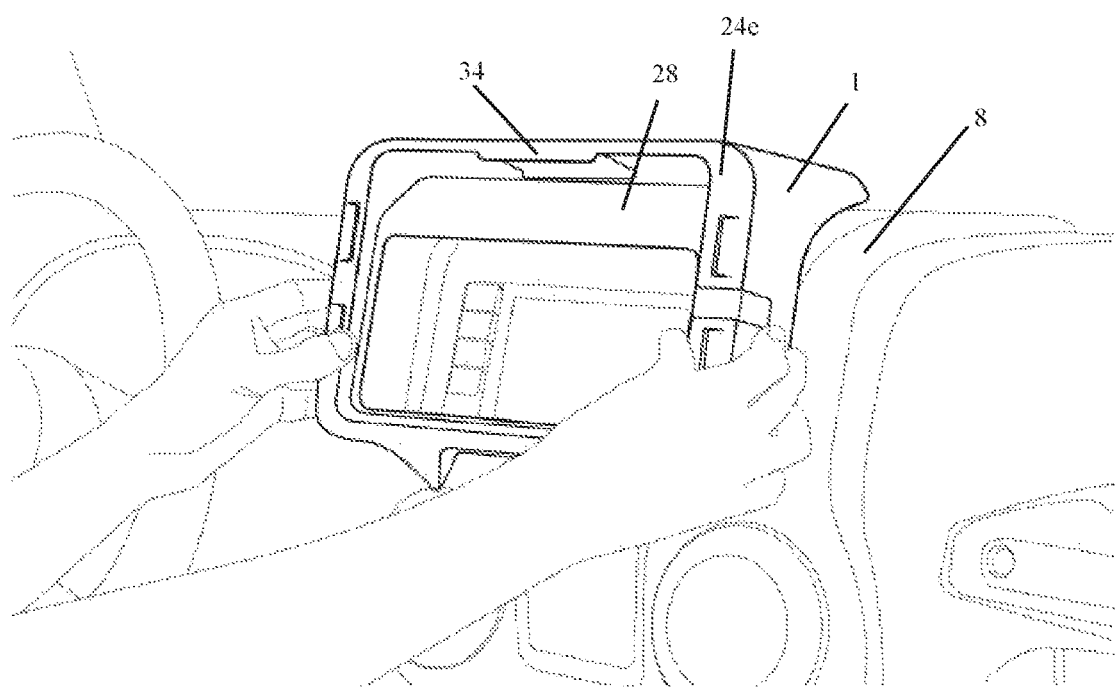
FIG. 11 illustrates aligning the casing of FIG. 2A with the dashboard, according to an embodiment.

FIG. 11 illustrates aligning the casing 1 of FIG. 2A with the factory vehicle dashboard 8 (shown in phantom lines), after the mating components 70 have been attached to the internal surface 20 of the vehicle dashboard 8 according to an embodiment. A similar movement is done but in the reverse motion to remove the casing 1 from the dashboard 8. There is a curve slope of the extended recessed portion 28 and two lips 34, according to an embodiment. The curve slope of the extended recessed portion 28 allows easy insertion and removal of the mobile device 3. The two lips 34 that function similarly to snap lock mechanisms allow securing of the mobile device to the casing 1. In this embodiment, the extended recessed portion 28 and the lips 34 are the securing mechanism.

Figure 12:
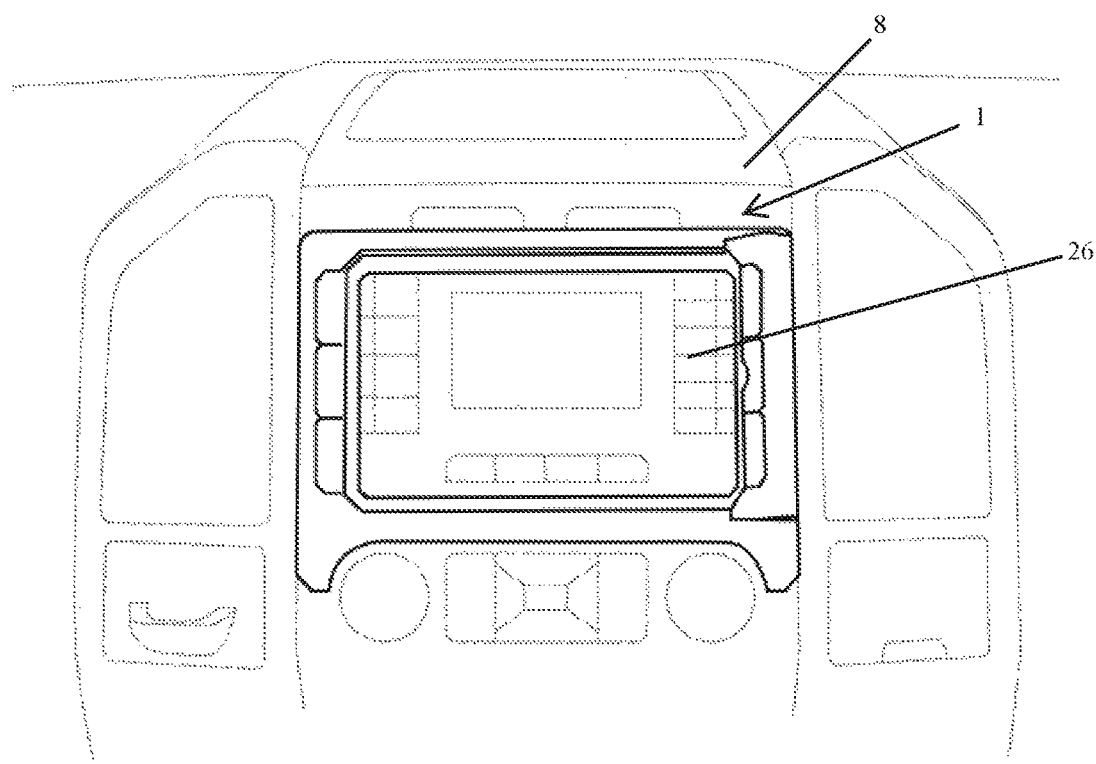
FIG. 12 illustrates the casing of FIG. 2B mounted on the dashboard without a mobile device, according to an embodiment.

FIG. 12 illustrates the casing 1 of FIG. 2B mounted on the dashboard 8 (shown in phantom lines) without a mobile device 3 secured, according to an embodiment. The casing 1 can be mounted horizontally as shown in FIG. 12 or it can also be mounted vertically on the front side of the vehicle dashboard 8. There is an opening 26 that allows the user to interact with the mobile device 3 once it is installed and also allows the user to set the configuration of the vehicle system to allow Bluetooth communication of the mobile device 3 before installing the mobile device 3 into the casing 1. The opening 26 is used for viewing a display of the mobile device 3. As shown, it is unnecessary for the user to remove the factory radio or change the factory dashboard 8 as the casing 1 seamlessly mounts on top of the factory dashboard. 8.

Figure 13A:
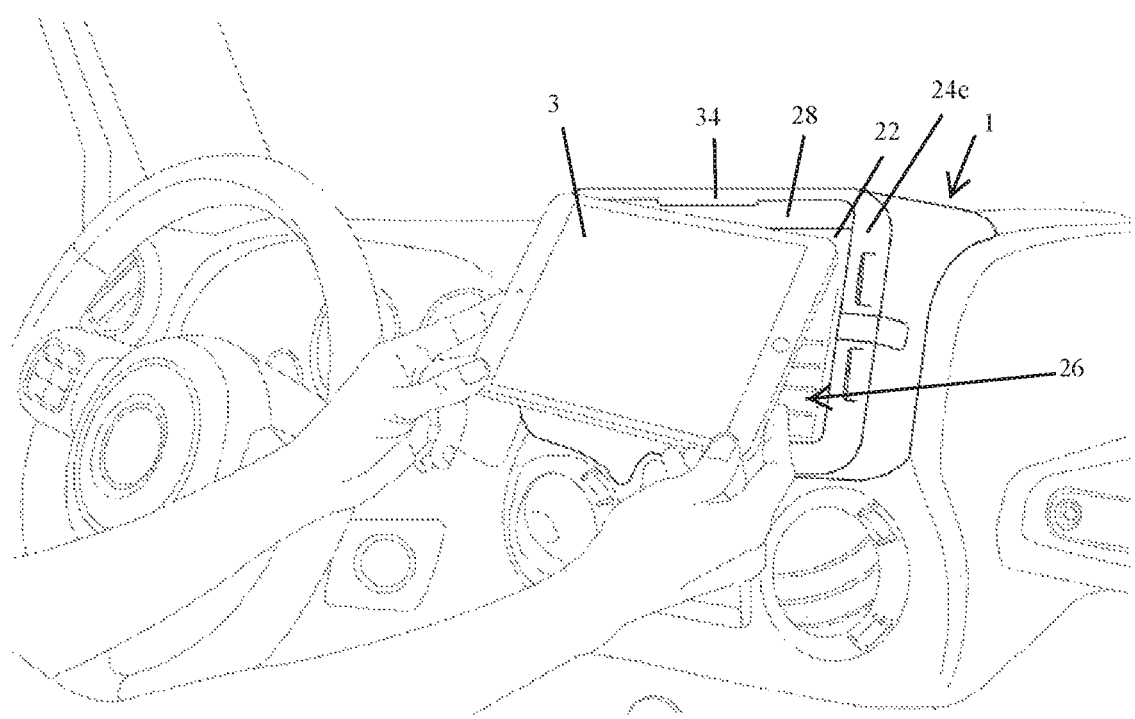
FIG. 13A illustrates installing or removing the mobile device from the casing of FIG. 2A, according to an embodiment.
Figure 13B:
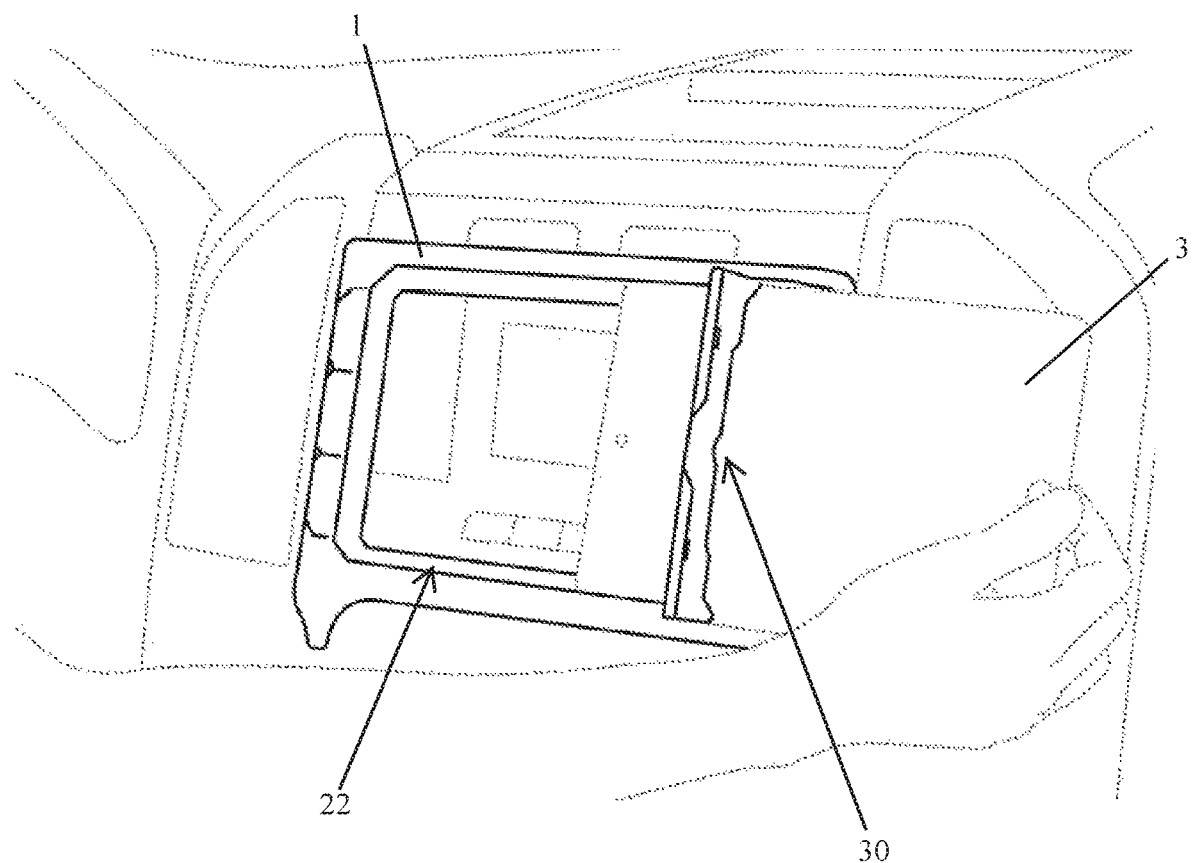
FIG. 13B illustrates another method of installing or removing the mobile device from the casing of FIG. 2B, according to an embodiment.

FIG. 13A and FIG. 13B illustrate installing or removing the mobile device 3 (shown in phantom lines) from the casing 1, according to embodiments of the present invention. Once the casing 1 is mounted on the vehicle dashboard 8 (shown in phantom lines), the casing 1 receives the mobile device 3 when the user slides the mobile device 3 into the inner surface 22 of the casing by sliding the mobile device 3 through one of the surfaces 24a-24e which comprise an aperture, i.e., a slot 30 or opening 26. A slot 30 refers to an area where the mobile device 3 can be inserted and removed. An opening 26 refers to an area where the mobile device 3 can be inserted and removed and used for viewing a display of the mobile device 3. FIG. 13A illustrates the mobile device 3 being inserted into the casing 1 (of FIG. 2A) through the opening 26 of the casing 1. Another type of securing mechanism used by the casing 1 for securing and supporting the mobile device 3 is the combination of the lip 34 and extended recess portion 28. The lip 34 is a projecting edge extending from the front surface 24e and the extended recess portion 28 extends from the inner surface of the casing 22. The extended recessed portion 28 supports the mobile device 3 by propping the mobile device 3 from the back. FIG. 13B illustrates the mobile device 3 (shown in phantom lines) sliding into the inner surface 22 of a casing 1 (of FIG. 2B) via a slot 30 at the right surface 24d. However, the mobile device 3 can be installed through the top surface 24a, bottom surface 24b, left surface 24c, right surface 24d and through the opening 26. The mobile device 3 can be secured to the casing 1 using a snap lock mechanism; however, other mounting means can be contemplated.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments or alternatives of the foregoing description.

What is claimed is:

1. A casing removably mountable on a factory dashboard, configured to surround a factory radio and to secure a mobile device within an inner surface of the casing, the casing comprising:
    one or more mounting components on a back surface of the casing for removably mounting the casing surrounding the factory radio on the factory dashboard;
    a front surface having a single continuous opening, wherein an edge of the single continuous opening surrounds the factory radio for viewing a display of the mobile device, a top surface, a bottom surface, a left surface and a right surface; and
    at least one aperture in a surface of the casing for inserting or removing the mobile device.

2. The casing of claim 1, wherein the one or more mounting components on the back surface of the casing are configured to mate with one or more mating components attached to an internal surface of the factory dashboard.

3. The casing of claim 1, wherein the one or more mounting components on the back surface of the casing are configured to mate with one or more mating components attached to a front surface of the factory dashboard.

4. The casing of claim 1, wherein the one or more mounting components are selected from the group consisting of magnets, fabric hooks and loop fasteners, double sided tape, and suction cups.

5. The casing of claim 1, further comprising at least one channel to secure the mobile device.

6. The casing of claim 1, further comprising a recessed portion to secure the mobile device.

7. The casing of claim 1, further comprising a ventilation cutout.

8. A casing system for removably mounting a casing on a factory dashboard, configured to surround a factory radio, the casing system comprising:
    the casing configured to secure a mobile device within an inner surface of the casing, the casing comprising
    one or more magnetic mounting components on a back surface of the casing for removably mounting the casing surrounding the factory radio on the factory dashboard;
    a front surface having a single continuous opening, wherein an edge of the single continuous opening surrounds the factory radio for viewing a display of the mobile device, a top surface, a bottom surface, a left surface and a right surface;
    an aperture in a surface for slidably inserting and removing the mobile device; and
    one or more magnetic mating components for mating with the one or more magnetic mount components on the back surface of the casing.

9. The casing system of claim 8, further comprising an extended recessed portion for securing the mobile device.

10. The casing system of claim 8, further comprising at least one channel along the top surface, the bottom surface, the left surface and the right surface of the inner surface of the casing for securing the mobile device.

11. The casing system of claim 8, wherein a longest dimension of the casing is set in a horizontal position relative to the factory dashboard.

12. The casing system of claim 8, wherein a shortest dimension of the casing is set in a vertical position relative to the factory dashboard.

13. The casing system of claim 8, further comprising a ventilation cutout.

14. A method of installing a removably mountable mobile device casing, configured to surround a factory radio on a factory dashboard of a vehicle, the removably mountable mobile device casing having one or more mounting components, the method of installing the mobile device casing comprising:
   a) removing the factory dashboard from the vehicle,
   b) aligning the mobile device casing against the factory radio of the factory dashboard,
   c) preparing a portion of the factory dashboard for attaching one or more mating components,
   d) attaching the one or more mating components to the portion of the factory dashboard;
   e) reinstalling the factory dashboard to the vehicle, and
   f) mounting the mobile device casing surrounding the factory radio on the factory dashboard such that the one or more mounting components mate with the one or more mating components.

15. The method of claim 14, wherein the step of preparing comprises wiping an adhesive promoter onto the portion of the factory dashboard.

16. The method of claim 14, wherein the portion of the factory dashboard is an internal surface of the factory dashboard surrounding the factory radio.

17. The method of claim 14, wherein the portion of the factory dashboard is the front surface of the factory dashboard surrounding the factory radio.

18. The method of claim 14, wherein the one or more mating components are selected from the group consisting of magnets, fabric hooks and loop fasteners, double sided tape, and suction cups.

19. The method of claim 14, wherein a longest dimension of the mobile casing is set in a horizontal position relative to the factory dashboard.

\* \* \* \* \*